(12) United States Patent
Kato et al.

(10) Patent No.: US 7,044,655 B2
(45) Date of Patent: May 16, 2006

(54) MULTICORE OPTICAL FIBER CONNECTOR FOR ENHANCING UNIFORMITY OF AMOUNT OF INCIDENT LIGHT AND OPTICAL SENSOR ARRAY USING THE SAME

(75) Inventors: Tadaharu Kato, Shizuoka-ken (JP); Shigeru Muramatsu, Shizuoka-ken (JP)

(73) Assignee: Yamaha Corporation, Shizuoka-ken (JP)

( * ) Notice: Subject to any disclaimer, the term of this patent is extended or adjusted under 35 U.S.C. 154(b) by 155 days.

(21) Appl. No.: 10/417,839

(22) Filed: Apr. 17, 2003

(65) Prior Publication Data

US 2003/0202754 A1    Oct. 30, 2003

(30) Foreign Application Priority Data

Apr. 25, 2002  (JP)  ............................. 2002-123745

(51) Int. Cl.
   *G02B 6/42* (2006.01)
(52) U.S. Cl. ........................................................ 385/89
(58) Field of Classification Search ................ 385/89, 385/48, 46, 26; 362/554, 558
   See application file for complete search history.

(56) References Cited

U.S. PATENT DOCUMENTS

| | | | | |
|---|---|---|---|---|
| 3,910,678 A | * | 10/1975 | McCartney et al. | ........... 385/58 |
| 3,932,023 A | * | 1/1976 | Humer | ........................ 385/35 |
| 4,013,342 A | * | 3/1977 | Narodny | ...................... 385/18 |
| 4,318,586 A | * | 3/1982 | Coyne | .......................... 385/46 |
| 4,488,773 A | * | 12/1984 | Wagner | ....................... 385/12 |
| 4,834,484 A | * | 5/1989 | Gorman et al. | ................ 385/26 |
| 4,931,634 A | * | 6/1990 | Toyama | ...................... 250/225 |
| 4,953,932 A | * | 9/1990 | Mihich | ........................ 385/26 |
| 5,395,362 A | * | 3/1995 | Sacharoff et al. | ........... 600/108 |
| 5,408,551 A | * | 4/1995 | Maria van Woesik | ........ 385/28 |
| 5,804,816 A | | 9/1998 | Yamamoto et al. | |
| 5,909,028 A | | 6/1999 | Yamamoto | |

* cited by examiner

Primary Examiner—Sung Pak
Assistant Examiner—Mike Stahl
(74) Attorney, Agent, or Firm—Harness, Dickey & Pierce, P.L.C.

(57) ABSTRACT

An optical sensor array includes light-emitting devices and sensor heads remote from the light-emitting devices, and each light-emitting device is optically coupled to plural sensor heads through optical fibers; the light-emitting device is optically connected to the optical fibers by means of a multicore optical fiber connector, and the multicore optical fiber connector keeps the optical axes of the optical fibers equally spaced from the optical axis of the light-emitting device; even though the light intensity is isotropically dispersed on the cross section of the light beam, the total amount of light incident on each optical fiber is equal to the total amount of light incident on any one of the other optical fibers so that a strict calibration is not required for the optical sensor array.

5 Claims, 6 Drawing Sheets

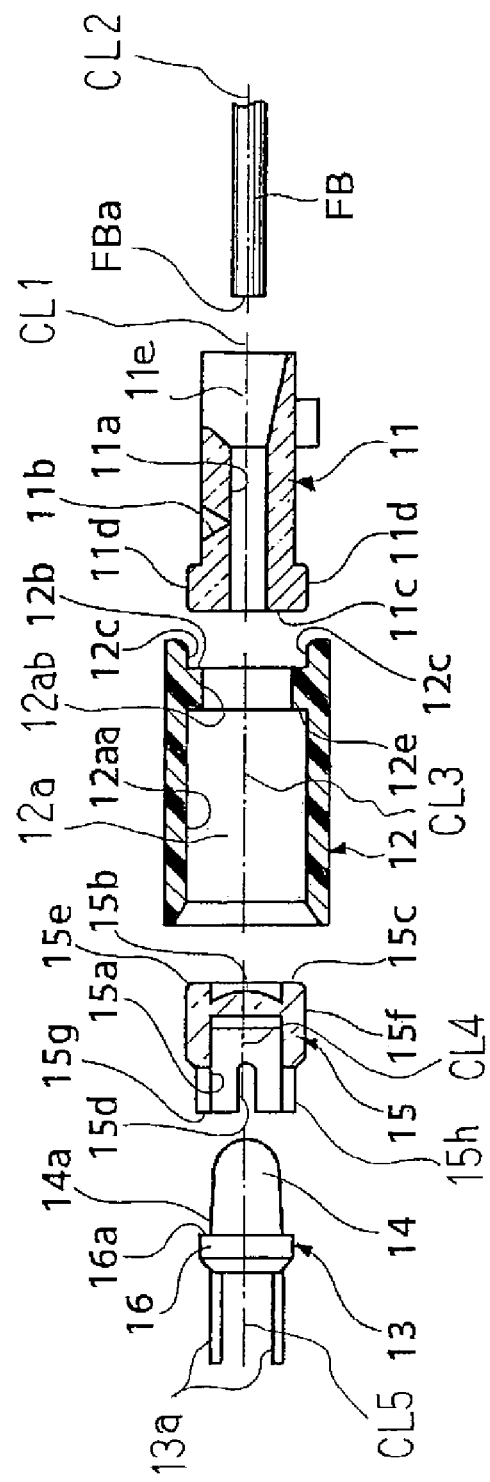
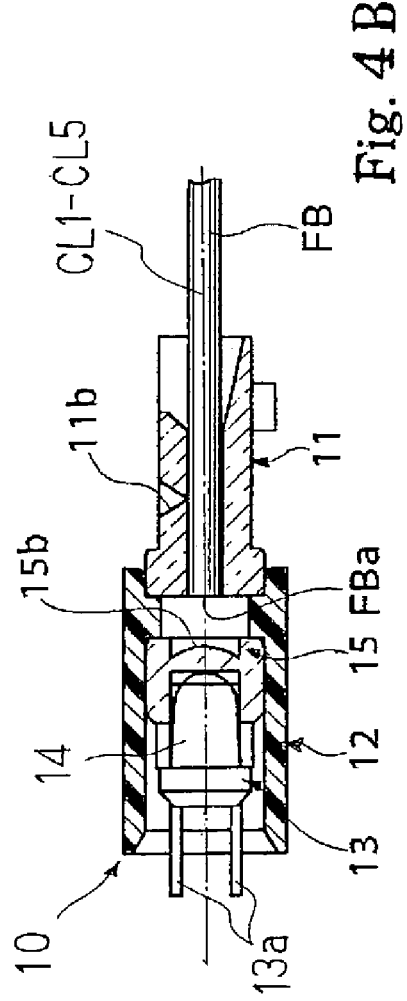
Fig. 4A
Fig. 4B

MULTICORE OPTICAL FIBER CONNECTOR FOR ENHANCING UNIFORMITY OF AMOUNT OF INCIDENT LIGHT AND OPTICAL SENSOR ARRAY USING THE SAME

FIELD OF THE INVENTION

This invention relates to an optical fiber connector and, more particularly, to a multicore optical fiber connector used between an optical device and a bundle of optical fibers and an optical sensor array using the same.

DESCRIPTION OF THE RELATED ART

Optical fibers have found wide varieties of application fields. The optical fibers are so flexible that user can easily route the optical fibers in a narrow crowded space. In fact, the optical fibers have been used as data transmission lines in a musical instrument such as, for example, a composite keyboard instrument. The component parts such as keys, key action units, hammers, dampers and strings are packed in a narrow space inside a cabinet. The keys are linked with the key action units and damper units, and the hammers are driven for rotation by depressed keys so as to strike the associated strings. The strings vibrate for generating acoustic piano tones.

The composite keyboard instrument can generate electronic tones instead of the acoustic piano tones. In order to generate the electronic tones, the composite keyboard instrument requires various sensors for monitoring key action and/or hammer action. The sensors monitor the keys and hammers, and notify a controller of present key positions and present hammer positions. The light source and light-to-electric signal converter are remote from the keys and hammers, and the pieces of position data representative of the present key positions and present hammer positions are transmitted between the light source/light-to-electric signal converter and the optical sensor heads through the optical fibers. Although the action units, hammers, dampers and strings are crowded in the narrow space, the manufacturer easily routes the optical fibers between the sensors and the controller.

At least a light emitting device, a pair of optical fibers, a light detecting device, a pair of optical sensor heads and a shutter plate are required for each key or each hammer. The shutter plate is secured to each key or hammer, and the optical sensor heads are opposed to one another across the trajectory of the shutter plate. One of the optical fibers is connected between the light emitting device and one of the optical sensor heads, and the other optical fiber is connected between the other optical sensor head and the light detecting device. The light emitting device emits light, and the light is incident onto the optical fiber. The light is propagated through the optical fiber to the optical sensor head, and a light beam is radiated from the sensor head to the other sensor head across the trajectory of the shutter plate. The light is received by the other optical sensor head, and is propagated through the optical fiber to the light detecting device. The light detecting device converts the light to electric current. When the player depresses the key, or when the action unit drives the hammer for rotation, the shutter plate is moved along the trajectory together with the key or hammer, and gradually interrupts the light beam. The amount of light at the light detecting device is reduced, and, accordingly, the electric current is reduced. Thus, the shutter position or key/hammer position is converted to the amount of electric current, and the controller decides the present key position or present hammer position on the basis of the amount of electric current.

The light emitting device and light detecting device are shared with other sensors from the economical aspect. This means that the light emitting device is optically coupled to the plural optical fibers. The light detecting device is also to be coupled to the plural optical fibers. A multicore optical fiber connector is used for the optical coupling between the light emitting device/light detecting device and the plural optical fibers.

A typical example of the multicore optical fiber connector is formed with cylindrical recesses connected to each other. One of the cylindrical recesses is open at one end of the prior art multicore optical fiber connector, and has a centerline. The optical device is inserted into the cylindrical recess. The other cylindrical recess is open at the other end of the prior art multi-core optical fiber connector, and also has a centerline. A bundle of optical fibers is inserted into the other cylindrical recess. The centerlines are aligned with one another so that the optical device is opposed to the bundle of optical fibers in such a manner that the center of the optical device is aligned with the center of the bundle.

The optical fibers are arranged to be close together, and each optical fiber is held in contact with the adjacent optical fibers without any gap. In other words, some optical fibers occupy a central zone of the bundle, and other optical fibers occupy the peripheral zone of the bundle. The light is incident onto the end surfaces of the optical fibers of the bundle. Some optical fibers have the end surfaces exposed to a central area of the cross section of the parallel light beam, and the other optical fibers have the end surfaces exposed to the peripheral area of the cross section of the parallel light beam.

Another prior art optical fiber connector is used for a bundle of optical fibers different in size. Cylindrical liners are selectively used for the optical fibers, and the optical fibers are arranged to be close together. Some optical fibers are exposed to a central area of the cross section of the light beam, and other optical fibers are exposed to the peripheral area of the cross section.

Yet another prior art optical fiber connector is used for a bundle of optical fibers, the end portions of which are coated with protective layers. The optical fibers are also arranged to be close together, and are optically coupled to the optical device.

A problem is encountered in those prior art optical fiber connectors in that the amount of incident light is different among the optical fibers. The light intensity is not strictly uniform over the cross section of the light beam radiated from the light emitting device. The light intensity is the strongest at the center of the cross section, and is gradually decreased toward the periphery of the cross section. The optical fibers in the central zone are exposed to the strong light, and the weak light is incident onto the optical fibers in the peripheral zone. As described hereinbefore, the controller decides the present key/hammer position on the basis of the amount of light at the light detecting device. If the amount of incident light were constant at the end surfaces of the optical fibers, the controller would precisely determine the present key/present hammer positions. However, the amount of incident light is different among the optical fibers due to the dispersion of light intensity. This means that a calibration is required for the key sensors and hammer sensors. A standard composite keyboard instrument has eighty-eight keys and eighty-eight hammers. Accordingly, the eighty-eight key sensors and eighty-eight hammer sensors are to be calibrated before delivery to users. The calibration work is time consuming, and increases the cost of delivery.

Another problem inherent in the second and third prior art optical fiber connectors is that the optical fibers are liable to be pulled out of the prior art optical fiber connectors. The prior art optical fiber connectors keep the bundle of optical fibers therein with the assistance of friction between the cylindrical liners/coating layers and the inner surface thereof. However, the cylindrical liners and coating layers can not offer strong friction to the prior art optical fiber connectors. For this reason, the second and third prior art optical fiber connectors are less resistive against the force exerted on the optical fibers in the direction to draw the optical fibers therefrom.

The applicants investigated other prior arts, and some documents drew inventor's attention. Optical fibers are disclosed in U.S. Pat. No. 5,909,028. The optical fibers are used in a keyboard musical instrument. Although the optical fibers are bundled, the U.S. Patent Specification is silent how the optical fibers are arranged in the bundle. Another document is U.S. Pat. No. 5,804,816. A bundle of optical fibers is disclosed in FIG. 12 and related description such as column. 10, lines 24–27. However, the U.S. Patent Specification is silent to how the optical fibers are arranged in the bundle.

SUMMARY OF THE INVENTION

It is therefore an important object of the present invention to provide a multicore optical fiber connector, which makes the amount of light at end surfaces of optical fibers equal.

It is another important object of the present invention to provide an optical sensor array, which includes an optical sensor array, which includes an optical device, plural optical fibers and the multicore optical fiber connector.

It is also an important object of the present invention to provide a multicore optical fiber connector, which prevents optical fibers from drawing out.

In accordance with one aspect of the present invention, there is provided an optical fiber connector for optically coupling an optical element to plural optical fibers comprising a device holder formed with at least one first hole having a first center axis coincident with a first optical axis of the optical element, which exhibit optical characteristics isotropically distributed in the at least one first hole with respect to the first optical axis, and an optical fiber plug coupled to the device holder, formed with at least one second hole having a second center axis aligned with the first optical axis and keeping the plural optical fibers in the aforesaid at least one second hole in such a manner that distances between the first optical axis and second optical axes of the plural optical fibers are equal to one another.

In accordance with another aspect of the present invention, there is provided an optical sensor array comprising photo-emitting sensor heads for radiating light beams, respectively, first optical fibers having photo-propagation paths equal in cross sectional area to one another and connected to the photo-emitting sensor heads, respectively, for propagating the light beams to the photo-emitting sensor heads, photo-receiving sensor heads provided on optical paths of the light beams for receiving the light beams, respectively, second optical fibers respectively connected to the photo-receiving sensor heads for propagating the light beams from the photo-receiving sensor heads to the other ends thereof, a light detecting unit connected to the other ends thereof for converting the light beams to output electric signals, and a light emitting unit including a light emitting device converting an input electric signal to the light beams, a device holder formed with at least one first hole having a first center axis coincident with a first optical axis of the light emitting device, which exhibit a light intensity isotropically distributed in the aforesaid at least one first hole with respect to the first optical axis and an optical fiber plug coupled to the device holder, formed with at least one second hole having a second center axis aligned with the first optical axis, and keeping the first optical fibers in the aforesaid at least one second hole in such a manner that distances between the first optical axis and second optical axes of the first optical fibers are equal to one another, thereby making the light beams equivalent in total amount of light to one another.

In accordance with yet another aspect of the present invention, there is provided an optical fiber connector for optically coupling an optical element to optical fibers comprising a device holder formed with at least one first hole for keeping the optical element therein and an optical fiber plug connected to the device holder and formed with at least one second hole connected to the aforesaid at least one first hole for keeping the plural optical fibers in such a manner as to be opposed to the optical element therein, and the plural optical fibers occupy a peripheral zone of the aforesaid at least one second hole in contact with one another.

BRIEF DESCRIPTION OF THE DRAWINGS

The features and advantages of the optical fiber connector and optical sensor array will be understood in more detail from the following description taken in conjunction with the accompanying drawings, in which FIG. 4A is a cross sectional view showing the component parts of the light emitting unit before assemblage, FIG. 4B is a cross sectional view showing the component parts of the light emitting unit after the assemblage.

DESCRIPTION OF THE PREFERRED EMBODIMENTS

First Embodiment

Keyboard Musical Instrument

Figure 1:
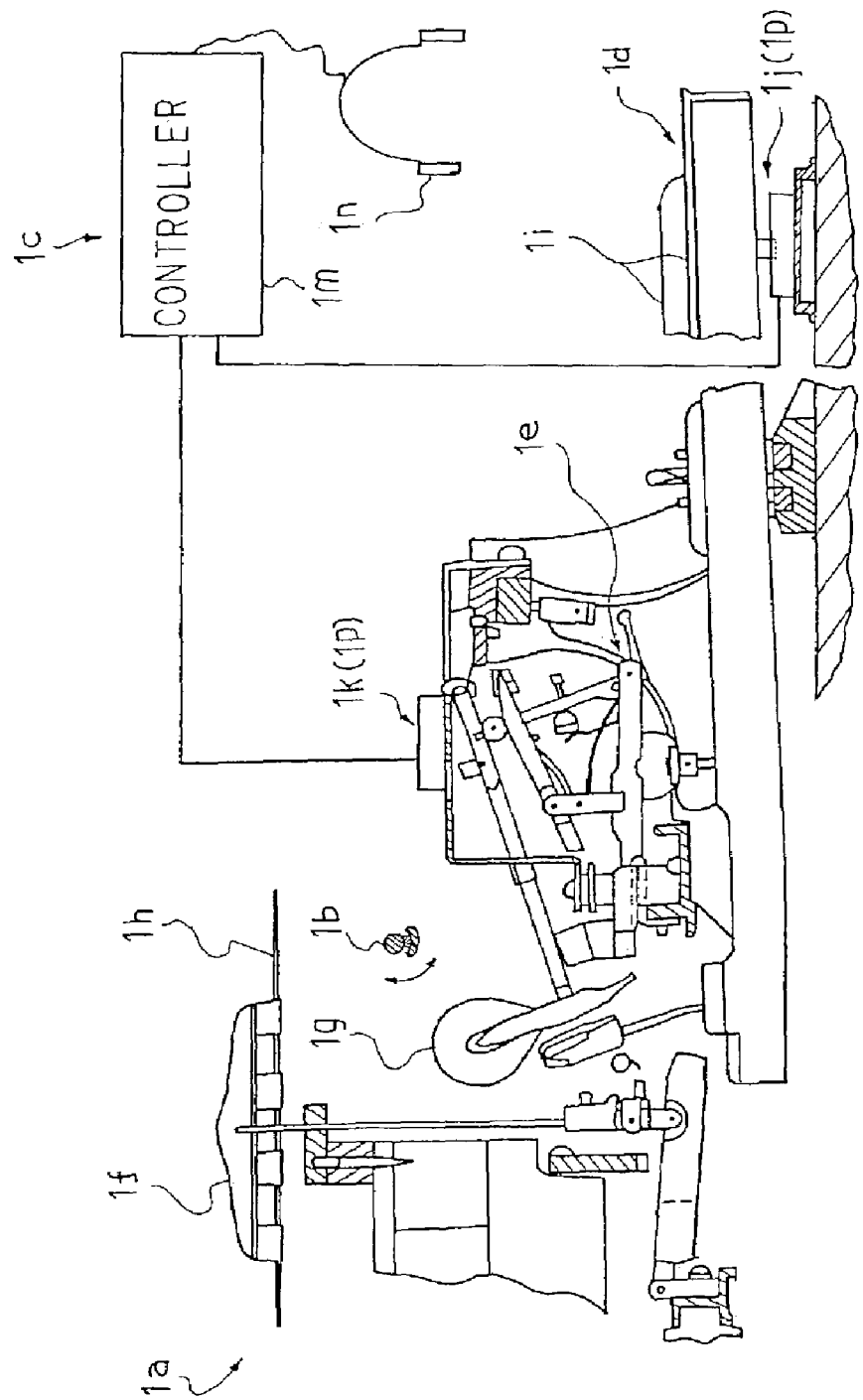
FIG. 1 is a schematic side view showing a composite keyboard instrument equipped with optical fiber connectors according to the present invention.

Referring to FIG. 1 of the drawings, a composite keyboard musical instrument largely comprises an acoustic piano 1a, a hammer stopper 1b and an electronic tone generating system 1c. Acoustic piano tones are selectively generated through the acoustic piano 1a. While a user is keeping the hammer stopper 1b at the free position, acoustic piano tones are selectively generated through the acoustic piano 1a. When the user changes the hammer stopper 1b to the blocking position, the hammer stopper 1b prohibits the acoustic piano 1a from generating the acoustic piano tones. The electronic tone generating system 1c responds to user's fingering, and generates electronic tones instead of the acoustic piano tones.

The acoustic piano 1a includes a keyboard 1d, action units 1e, dampers 1f, hammers 1g and strings 1h. Eighty-eight black/white keys 1i are incorporated in the keyboard 1d. The user selectively depresses and releases the black/white keys 1i. The depressed keys 1i make the dampers 1f spaced from the strings 1h, and actuate the associated action units 1e. The action units 1e drive the associated hammers for rotation through escape, and the hammers 1g are moved along trajectories toward the associated strings 1h. If the user has changed the hammer stopper 1b to the free position, the hammer stopper 1b is out of the trajectories of the hammers 1g so that the hammers 1b strike the associated strings 1h at the end of the free rotation. If, on the other hand, the user has changed the hammer stopper 1b to the blocking position, the hammer stopper 1b enters the trajectories of the hammers 1g so that the hammers 1g rebound on the hammer stopper 1b before striking the strings 1h.

The electronic tone generating system 1c includes key sensors 1j, hammer sensors 1k, a controller 1m and a sound system provided with a headphone 1n. The key sensors 1j monitor the black/white keys 1i, respectively, and supply key position signals representative of present key positions to the controller 1m. Similarly, the hammer sensors 1k monitor the hammers 1g, and supply hammer position signals representative of present hammer positions to the controller 1m.

The controller 1m periodically checks the signal ports assigned to the key position signals and hammer position signals, and accumulates pieces of key position data and pieces of hammer position data in an internal memory. The controller 1m analyzes the accumulated data representative of the present key positions to see whether or not the user depresses or releases the black/white keys 1i. When the controller 1m acknowledges that the user depresses or releases the black/white key 1i, the controller 1m decides a note-on event or a note-off event, and gets ready to generate electronic tones or decay the electronic tones. The controller 1m further analyzes the accumulated data representative of the present hammer positions for the depressed keys 1i, and calculates the hammer velocity. When the note-on event takes place, a key assignor, which forms a part of the controller 1m, assigns a channel to each depressed key, and a series of waveform data is read out from a waveform memory, which also forms a part of the controller 1m. The series of waveform data is converted to an analog audio signal, and the analog audio signal is supplied to the headphone 1n for being converted to the electronic tone. On the other hand, when the note-off event takes place, the key assignor instructs the channel to stop the data read-out, and the analog audio signal is delayed.

Figure 2:
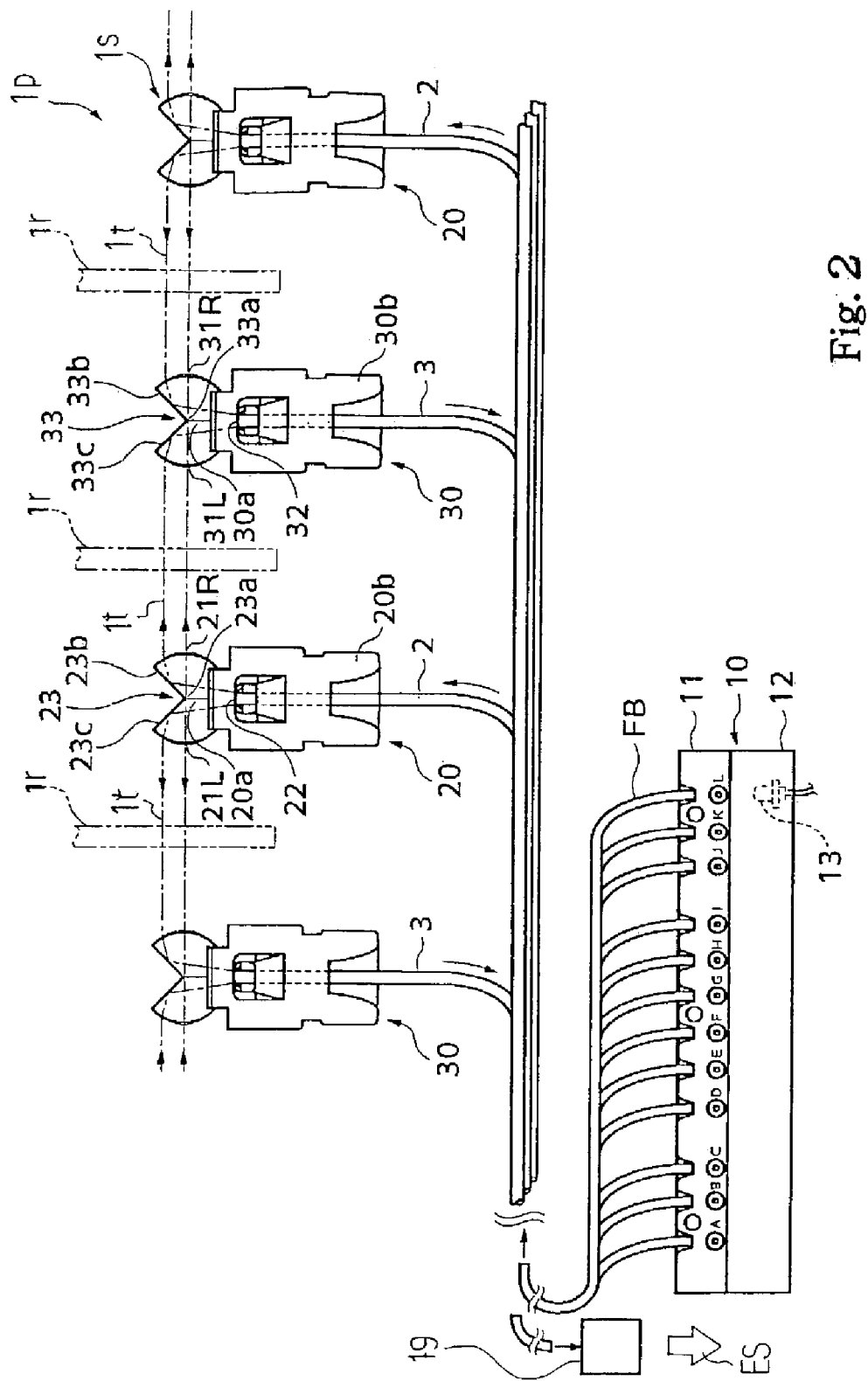
FIG. 2 is a schematic plane view showing an array of optical sensors incorporated in the composite keyboard instrument.

The key sensors 1j and hammer sensors 1k are similar in system configuration to each other, and, for this reason, the key sensors 1j and hammer sensors 1k are hereinafter described in detail as an optical sensor array 1p with reference to FIG. 2.

Optical Sensor Array

The optical sensor array 1p includes shutter plates 1r and an optical system 1s. The shutter plates 1r are secured to the lower surfaces of the black/white keys 1i and hammer shanks of the hammers 1g so that the shutter plates 1r are moved together with the black/white keys 1i and hammers 1g along the trajectories. The optical system 1s radiates light beams 1t across the trajectories, and converts the light to the key position signals and hammer position signals.

The optical system 1s includes optical fibers 2 for outward optical paths, optical fibers 3 for homeward paths, a light emitting unit 10, a light detecting unit 19, light-emitting sensor heads 20 and light-detecting sensor heads 30. The optical fibers 2/3 are made of transparent synthetic resin such as, for example, acrylic resin, and have the diameter of the order of 0.5 millimeter. In other words, the optical fibers 2 are equal in cross sectional area to one another. Similarly, the optical fibers 3 are equal in cross sectional area to one another. The optical fibers 2 form plural bundles FB, and the optical fibers 3 also form plural bundles FB. The light emitting unit 10 is connected at the light output ports A, B, C, D, E, F, G, H, I, J, K and L to the twelve bundles FB of optical fibers 2, and the optical fibers 2 of those bundles FB are separated from one another so as to be connected at the other ends thereof to the light-emitting sensor heads 20. In this instance, the bundle FB includes five optical fibers 2 at the maximum.

Though not shown in the drawings, a time frame is repeated in the control sequence for the optical system 1S, and each time frame has twelve time slots respectively assigned light output ports A to L of the light-emitting unit 10. Each of the bundles FB is assigned one of the light output ports A to L. The light-emitting unit 10 sequentially radiates light from the light output ports A to L to the associated bundles FB, and the light is incident into the optical fibers 2 of the associated bundle FB at each light output port A, . . . or L. In other words, the light is radiated from one light output port to another light output port, and is incident onto the optical fibers 2 of each bundle FB in associated one of the time slots.

A typical example of the controlling method for the optical system 1s is disclosed in Japan Patent Application laid-open No. 9-152871. A matrix of switching element is connected between the light-emitting unit 10 and the light-detecting unit 19, and the controller 1m specifies the black/white key 1i or hammer 1g on the basis of the time slots and the change of the key position/hammer position signals.

The light is propagated from the light output ports A–L to the light-emitting sensor heads 20 through the optical fibers 2, and is radiated from the light-emitting sensor heads 20 toward the light-detecting sensor heads 30 as the light beams 1t. The light beams 1t are incident into the light-detecting sensor heads 30, and the light is propagated through the optical fibers 3 to light input ports of the light-detecting unit 19. The light is converted to the key/hammer position signals ES. The light radiated from one of the light output ports A–L reaches all of or selected ones of the light input ports of the light detecting unit 19. The light radiated from next light output port reaches all of or selected ones of the light input ports. The combinations between the light output ports A–L, i.e., the time slots and the light input ports are assigned to all the shutter plates 1r, respectively, and the controller 1m correlates the key/hammer position signals ES with the black/white keys 1i or hammers 1g.

The light-emitting sensor heads 20 are alternated with the light-detecting sensor heads 30, and the shutter plates 1r have the trajectories in the gaps between the light-emitting sensor heads 20 and the light-detecting sensor heads 30. The light-emitting sensor heads 20 and light-detecting sensor heads 30 are made of transparent synthetic resin such as, for example, acrylic resin. The light-emitting sensor heads 20 and light-detecting sensor heads are shaped through a molding process.

Each of the light-emitting sensor heads 20 is broken down into a head portion 20a and a holder portion 20b. The holder portion 20b is formed with a narrow groove, and the associated optical fiber 2 is inserted into the narrow groove. The light output end 22 of the optical fiber 2 is directed to the head portion 20a. The head portion 20a is partially cut away like a V-letter, and reflecting surfaces 23b/23c define the V-letter shaped space 23. The head portion 20a is further formed with a pair of convex lenses 21L/21R, and the convex lenses 21L/21R are opposed to the adjacent light-detecting sensor heads 30.

The reflecting surface 23b abuts on the other reflection surface 23c along an edge 23a, and the reflection surfaces 23b/23c are spaced from one another by 90 degrees. The edge 23a is on the extension line of the center axis of the optical fiber 2 at the light output end 22, and the center axis of the optical fiber 2 is coincident with the perpendicular bisector of a virtual triangle defined by the reflection surfaces 23b/23c. When the light is radiated from the light output end 22 toward the reflection surfaces 23b/23c, the light is incident on the reflection surfaces 23b/23c, and is split into two light beams. The light beams are reflected on the reflection surfaces 23b/23c, and are directed to the convex lenses 21L/21R. The convex lenses 21R/21L convert the incident light to the parallel light, and the light beams It are radiated toward the adjacent light-detecting sensor heads 30.

The light-detecting sensor heads 30 are similar in configuration to the light-emitting sensor heads 20. Each of the light-detecting sensor heads 30 is also broken down into a head portion 30a and a holder portion 30b. The holder portion 30b is formed with a narrow groove, and the associated optical fiber 3 is inserted into the narrow groove. The head portion 30a is confronted with the input end 32 of the optical fiber 3. The head portion 30a is partially cut away like a V-letter, and reflecting surfaces 33b/33c define the V-letter shaped space 33. The head portion 30a is further formed with a pair of convex lenses 31L/31R, and the convex lenses 31L/31R are opposed to the adjacent light-emitting sensor heads 30.

The reflecting surface 33b abuts on the other reflection surface 33c along an edge 33a, and the reflection surfaces 33b/33c are also spaced from one another by 90 degrees. The edge 33a is on the extension line of the center axis of the optical fiber 3, and the center axis of the optical fiber 3 is coincident with the perpendicular bisector of a virtual triangle defined by the reflection surfaces 33b/33c.

The light beam It is incident onto one of the convex lenses 31L/31R. The light beams 1t are never concurrently incident onto both convex lenses 31L/31R, because the light-emitting sensor heads 20 on both sides of each light-detecting sensor head 30 are assigned different two of the light output ports A to L. The convex lens 31L/31R concentrates the incident light beam 1t on certain areas of the associated reflection surface 33b/33c, and the reflection surface 33b/33c directs the light beam 1t to the light input end 32 of the optical fiber 3. The light is propagated through the optical fiber 3, and reaches the light-detecting unit 19. The light-detecting unit 19 includes plural light-detecting devices such as, for example, photo transistors, and the bundles FB of optical fibers are respectively connected to the light-detecting devices. The light-detecting devices convert the light to the key position/hammer position signals ES.

Light-Emitting Unit

Figure 3:
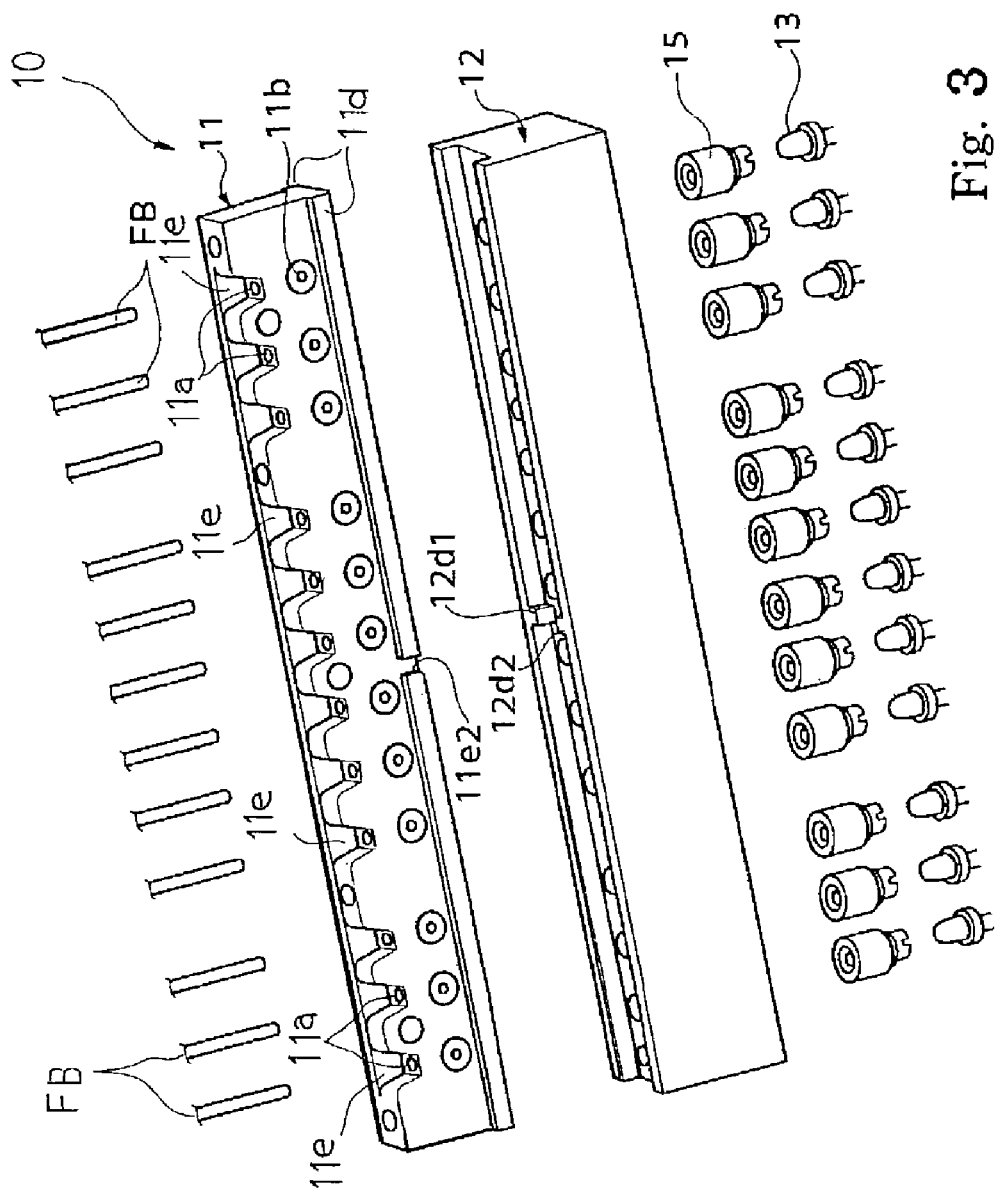
FIG. 3 is a schematic fragmentary view showing component parts of a light-emitting unit incorporated in the array of optical sensors.

Turning to FIG. 3 of the drawings, the light-emitting unit 10 includes an optical fiber plug 11, a light emitting diode socket 12, plural light emitting diodes 13 and plural collimator lens units 15. In this instance, the optical fiber plug 11 and light-emitting diode socket 12 as a whole constitute a multi-core optical fiber connector. In the following description, term "front" is indicative of a position closer to the bundles FB of optical fibers 2 than a "rear" position. For example, the optical fiber plug 11 is in front of the light-emitting diode socket 12, and the "front" is closer to the right side than the "rear" in FIGS. 4A and 4B.

The optical fiber plug 11 is a generally rectangular parallelepiped shape, and a pair of spigots 11d sideward projects from the rear end portion. Namely, the optical fiber plug 11 has a cross section like an inverted T-letter. In this instance, the optical fiber plug 11 is made of transparent synthetic resin such as, for example, polycarbonate.

Twelve cylindrical through-holes 11a are formed in the optical fiber plug 11. The cylindrical through-holes 11a extend in the fore-and-aft direction, and are open to valleys 11e and on the rear end surface 11c. The center axis of the cylindrical through-hole 11a is labeled with CL1 in FIG. 4A. The cylindrical through-holes 11a are respectively assigned to the bundles FB of optical fibers 2, and the center axis of the bundle FB is labeled with CL2. When the bundles FB of optical fibers 2 are inserted into the cylindrical through-holes 11a, the center axes CL1/CL2 are coincident with one another. Twelve injection holes 11b are further formed in the optical fiber plug 11.

The injection holes 11b are respectively associated with the through-holes 11a, and are open on the side surface of the optical fiber plug 11 and to the associated through-holes 11a as will be better seen in FIG. 4A. The spigots 11d are partially removed from the optical fiber plug 11, and gaps 11e2 are formed in the split spigots 11d (see FIG. 3).

The light-emitting diode socket 12 has a generally rectangular parallelepiped shape, and is as long as the optical fiber plug 11. In this instance, the light-emitting diode socket 12 is made of copolymer of acrylonitril-butadiene-styrene, i.e., ABS resin. Twelve through-holes 12a are formed in the light-emitting diode socket 12, and are open to a socket 12c and at the other ends on the rear end surface. The center line of the through-hole 12a is labeled with CL3. The through-holes 12a are broken down into rear zones 12aa and front zones 12ab. The rear zones 12aa are larger in diameter than the front zones 12ab, and, for this reason, shoulders 12e are formed between the rear zones 12aa and the front zones 12ab. The diameter of the front zones 12ab is less than the width of the socket 12c so that the front zones 12ab are open on the bottom surface 12b defining the bottom of the socket 12c. The rear zones 12aa are diverged in the rear end portion, and are open to the outside.

The socket 12c extends in the longitudinal direction of the light-emitting diode socket 12 like a groove, and has the constant width approximately equal to the distance between the end surfaces of the spigots 11d. For this reason, the pair of spigots 11d is snugly received in the socket 12c, and the rear surface 11c is brought into contact with the bottom surface 12b. The depth of socket 12c is less than the distance between the rear surface 11c and the injection hole 11b. Even when the rear end surface 11c is brought into contact with the bottom surface 12b, the injection hole 11b is outside of the socket 12c. Thus, the pair of spigots 11d is snugly received in the socket 12c, and the virtual plane where the centerline CL3 extend is made coplanar with the virtual plane where the centerline CL1 extend.

The light-emitting diode socket 12 is formed with a pair of lugs 12d1/12d2. The lugs 121/12d2 project into the socket 12c (see FIG. 3), and are confronted with one another. The lugs 121/12d2 are spaced from right surface of the light-emitting diode socket 12 by a predetermined distance, and the gaps 11e2 are also spaced from the right surface by the predetermined distance. The width of the lugs 121/12d2 is approximately equal to the width of the gaps 11e2 so that the lugs 121/12d2 are snugly received in the gaps 11e2. When the lugs 121/12d2 are received in the gaps 11e2, the right surface and left surface of the optical fiber plug 11 become coplanar with the right surface and left surface of the light-emitting diode socket 12, respectively, and the centerlines CL1 are automatically aligned with the centerlines CL3, respectively. Thus, the spigots 11d/socket 12c and gaps 11e2/lugs 121/12d2 make the centerlines CL1 automatically aligned with the centerlines CL3.

The collimator lens units 15 have a generally cylindrical shape, and have respective cylindrical bodies 15f and respective deformable tails 15h. The collimator lens units 15 are made of transparent synthetic resin such as, for example, acrylic resin. Cylindrical recesses 15a are formed in the collimator lens units 15, and have center axes CL4. The cylindrical recesses 15a penetrate from the rear end surfaces 15g through the tails 15h into the cylindrical bodies 15f, and slits 15d are formed in the tails 15h. In other words, each tail 15h is separated into four pieces. When the four pieces are pressed outwardly, the pieces are deformed in such a manner to increase the diameter of the cylindrical recess 15a.

The cylindrical bodies 15f are approximately equal in diameter to the rear zones 12aa of the through-holes 12a, and are larger in diameter than the front zones 12ab. For this reason, when the collimator lens units 15 are inserted into the through-holes 12a, the front surfaces 15c are brought into contact with the shoulders 12e, and the center axes CL4 become coincident with the center axes CL3, respectively.

Collimator lenses 15b define the bottoms of the cylindrical recesses 15a, and are slightly retracted from the front end surfaces 15c. In other words, guard portions 15e are formed in the cylindrical bodies 15f, and prevent the collimator lenses 15b from undesirable contaminant and mechanical damages. The collimator lenses 15b have respective optical axes coincident with the center axes CL4, respectively. The collimator lenses 15b are smaller in diameter than the front zones 12ab, and are larger in diameter than the bundle FD. The collimator lenses 15b condense the light onto the bundles FB of optical fibers 2, and a large amount of light is incident on the end surfaces of the bundles FB of optical fibers 2.

The light emitting diodes 13 are similar in structure to one another. Each of the light emitting diodes 13 includes a disc-shaped substrate 16, a semiconductor light emitting diode (not shown) on the disc-shaped substrate 16, a semi-ellipsoid cover piece 14 and electrodes 13a. The semiconductor light emitting diode (not shown) is mounted on the front surface 16a of the disc-shaped substrate 16, and is covered with the semi-ellipsoid cover piece 14. Electric power is sequentially supplied from the controller 1m through the electrodes 13a to the semiconductor light emitting diodes, and causes the semiconductor light emitting diodes to radiate laser light. The semi-ellipsoid cover piece 14 has a center axis CL5, and the center axis CL5 serves as the optical axis for the light radiated from the semiconductor light emitting diode. The semi-ellipsoid cover piece 14 is transparent to the light radiated from the semiconductor light emitting diode. The disc-shaped substrate 16 is larger in diameter than the cylindrical recess 15a, and the semi-ellipsoid cover piece 14 is gradually increased in diameter toward the disc-shaped substrate 16. The diameter of the semi-ellipsoid cover piece 14 is maximized on the front surface 16a, and the maximum diameter is slightly greater than the diameter of the cylindrical recess 15a. When the light-emitting diode 13 is pushed into the cylindrical recess 15a, the semi-ellipsoid cover piece 14 is brought into contact with the bottom surface defining the cylindrical recess 15a, and the rear surface 15g is brought into contact with the peripheral area of the front surface 16a. The peripheral surface 14a pushes the separated tail 15h outwardly, and the separated pieces are deformed. For this reason, the resilient force is exerted on the peripheral surface 14a, and the semi-ellipsoid cover piece is clamped by the separated tail 15h. The center axis CL5 is coincident with the center axis CL4.

Those component parts 11, 12, 13 and 15 are assembled into the light emitting unit 10 as follows. The assembling method is broken down into two steps. In the first step, the light emitting diodes 13, collimator lens units 15 and light-emitting diode socket 12 are assembled together, and the bundles FB of optical fibers are assembled with the optical fiber plug 11. Subsequently, the optical fiber plug 11 and light-emitting diode socket 12 are assembled into the light-emitting unit 10.

In the first step, two of the light emitting diodes 13, collimator lens units 15 and light-emitting diode socket 12 are assembled together, and, subsequently, the resultant structure is assembled with remaining one of the light emitting diodes 13, collimator lens units 15 and light-emitting diode socket 12.

In detail, the center axis CL5 of the light emitting diode 13 is roughly aligned with the center axis CL4 of the associated collimator lens unit 15, and each of the semi-ellipsoid cover piece 14 is pushed into the cylindrical recess 15a of the associated collimator lens unit 15. The semi-ellipsoid cover piece 14 firstly proceeds into the cylindrical recess 15a without any contact with the inner surface defining the cylindrical recess 15a, and, thereafter, the peripheral surface 14a is brought into contact with the inner surface of the tail 15h. Then, the assembling worker strongly pushes the light-emitting diode 13 into the cylindrical recess 15a. The peripheral surface 14a pushes the separated tail 15h away so that the separated pieces are outwardly deformed. The deformed tailpieces exert the resilient force on the semi-ellipsoid cover piece 14, and make the center axis CL5 aligned with the center axis CL4. When the rear surface 15g is brought into contact with the peripheral area of the front surface 16a, the semi-ellipsoid cover piece 14 reaches the bottom surface defining the cylindrical recess 15a, and the collimator lens unit 15 clamps the semi-ellipsoid cover piece 14 with the resiliently deformed tail 15h.

In order to assemble the collimator lens units 15 with the light-emitting diode socket 12, the center axis CL4 of each collimator lens unit 15 is roughly aligned with the center axis CL3 of the associated through-hole 12a. The collimator lens units 15 are moved into the associated through-holes 12a. The diverged portions make the center axes CL4 respectively aligned with the center axes CL3, and the cylindrical bodies 15f are driven to slide on the inner surfaces defining the associated through-holes 12a. When the front surfaces 15c are brought into contact with the shoulder portions 12e, the collimator lens units 15 are assembled with the light-emitting diode socket 12 with the center axes CL3/CL4 coincident with one another. However, the collimator lenses 15b are still spaced from the front zones 12ab as shown in FIG. 4B.

On the other hand, the bundles FB of optical fibers are assembled with the optical fiber plug 11 as follows. First, the center axes CL2 of the bundles FB of optical fibers are roughly aligned with the center axes CL1 of the through-holes 11a, and the bundles FB of optical fibers are moved into the valleys 11e. The valleys 11e guide the bundle FB of optical fiber to the through-holes 11a, and the end surfaces FBa are inserted into the through-holes 11a. Then, the center axes CL2 are aligned with the center axes CL1 of the through-holes 12a. The bundles FB of optical fibers proceed to the rear surface 11c, and the end surfaces FBa rearward project over the rear surface 11c. The length of the projecting portions may be irregular.

Adhesive compound liquid is injected into the injection holes 11b. The adhesive compound liquid penetrates into the through-holes 11a so that the bundles FB of optical fibers are adhered to the inner surfaces defining the through-holes 11a. Moreover, the optical fibers 2 of each bundle FB are adhered to one another. Finally, the projecting portions are cut away from the bundles FB so that the fresh end surfaces FBa are substantially coplanar with the rear surface 11c of the optical fiber plug 11.

Upon completion of the first step, the optical fiber plug 11 is assembled with the light-emitting diode socket 12. The lugs 121/12d2 are roughly aligned with the gaps 11e2, and the pair of spigots 11d of the optical fiber plug 11 is pressed into the socket 12c. The lugs 121/12d2 are snugly received in the gaps 11e2, and the lugs 121/12d2 and gaps 11e2 make the center axes CL1/CL2 aligned with the center axes CL3/CL4/CL5. The resultant structure of the light-emitting unit 10 is shown in FIG. 4B.

In operation, the controller 1m assigns the time slots to the light-emitting diodes 13, respectively, and selectively energizes the light-emitting diodes 13 in the associated time slots. When the light emitting diode 13 shown in FIG. 4B is energized, the light is radiated from the semiconductor light emitting diode, and is incident onto the collimator lens 15b. The collimator lens 15b converts the incident light to the parallel light, and the parallel light proceeds through the front zone 12ab. The parallel light is incident into the optical fibers 2 of the bundle FB, and is propagated through the optical fibers 2 to the associated light emitting sensor heads 20. The amount of light incident into each optical fiber 2 is approximately equal to the amount of light incident into the other optical fibers 2 of the same bundle FB. The reason why the light is evenly distributed to the optical fibers 2 will be hereinlater described in detail.

As will be understood, the component parts 11, 12, 13 and 15 are designed in such a manner that the center axes CL2 of the bundles FB are automatically aligned with the center axes CL1/CL3/CL4/CL5 of the component parts 11, 12, 13 and 15. Thus, the assembling work is simple and easy for the assembling workers. Moreover, the bundles FB of optical fibers are adhered to one another and to the optical fiber plug 11 with the adhesive compound liquid. For this reason, the optical fibers 2 are hardly pulled out from the optical fiber plug 11. Thus, the optical system 1s is stable, and exactly converts the present key/hammer positions to the key position/hammer position signals ES.

Figure 5A:
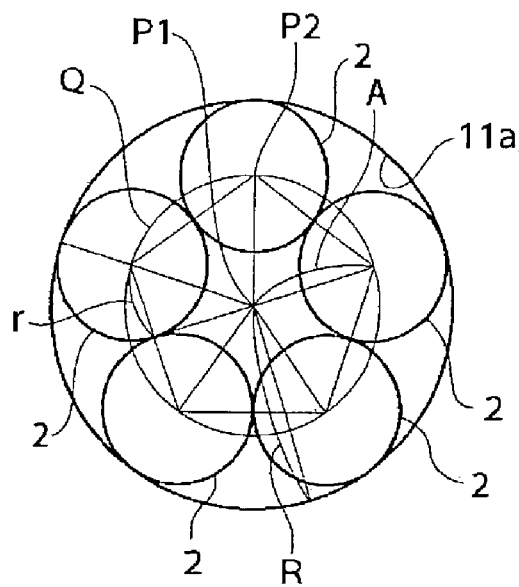
FIGS. 5A to 5D are schematic views showing cross sections of bundles different in number of component optical fibers from one another.
Figure 5B:
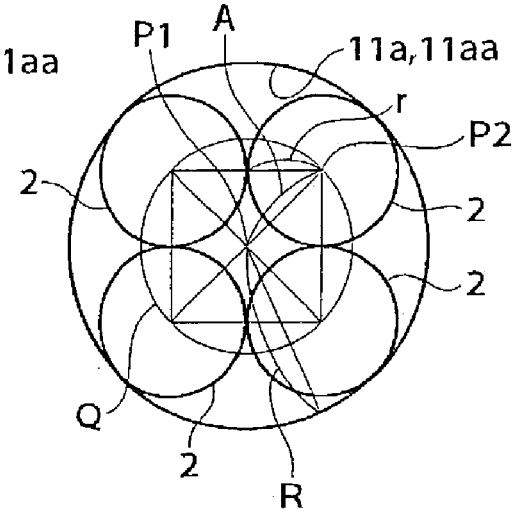
Figure 5C:
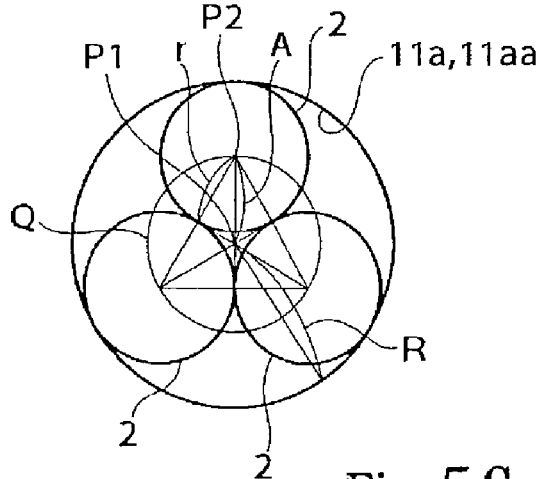
Figure 5D:
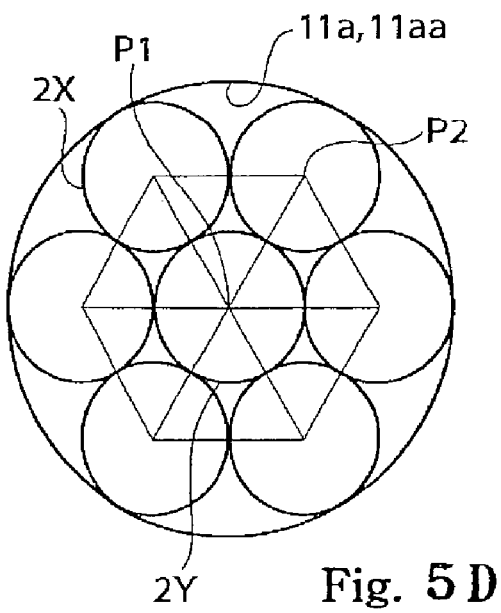

Description is hereinafter made on the reason why the light is evenly distributed to the optical fibers 2 with reference to FIGS. 4A to 4D. FIG. 5A shows the five optical fibers 2 forming the bundle FB, FIG. 5B shows the four optical fibers 2 forming another bundle FB, and FIG. 5C shows the three optical fibers 2 forming yet another bundle FB. FIG. 5D shows six optical fibers forming a bundle used in another optical system 1s.

In FIGS. 5A to 5C, reference sign P1 designates the center axis CL1 of the through-hole 11a, and reference sign P2 is indicative of the center axis of each optical fiber 2. The through-hole 11a has the radius of curvature "R", and the optical fibers 2 have the radius of curvature "r". The distance between the center axis P1 and each of the center axes P2 is represented by "A".

$$r = A \sin(\delta/n) \quad \text{Equation 1}$$

Equation 1 is rewritten as $$A = r/\sin(\delta/n) \quad \text{Equation 1'}$$

The radius of curvature R is expressed as $$R = A + r \quad \text{Equation 2}$$

Substitute Equation 1' for A, then we obtain $$R = r + r/\sin(\delta/n) \quad \text{Equation 3}$$

If the optical fibers 2 and the boundary of their bundle BF satisfy equation 3, all of the optical fibers 2 are held in contact with the inner surface 11aa defining the through-hole 11a, each optical fiber 2 is further held in contact with the adjacent optical fibers 2, and the axes P2 of all the optical fibers 2 are on a virtual circle Q. Although the collimator lens 15b is provided between the light emitting diode 13 and the bundle FB of optical fibers 2, the light intensity is reduced in a binomial distribution from the center axis P1. In other words, the light intensity is isotropically varied with respect to the optical axis coincident with the center axis P1. The optical axis CL5 is aligned with the center axis P1 so that the light intensity at the center axes P2 is equal to one another, because all the center axes P2 are on the virtual circle Q. The cross sections of optical fibers 2 overlapped with the virtual circle Q are equal in area to one another. For this reason, amount of light incident in each optical fiber 2 is approximately equal to the amount of light incident in the other optical fibers 2.

Even if the center axes P2 are slightly offset from the virtual circle Q, the fluctuation of the amount of incident light is negligible, because the center axes P2 are spaced from the center axis P1.

The contact between the optical fibers 2 and the inner surface and between the adjacent optical fibers 2 is desirable from the aspect of the strong resistance against the drawing force, because the friction area is increased. Thus, the optical fibers 2 are hardly drawn out from the optical fiber plug 11 by virtue of the adhesive compound and wide friction area.

It is preferable to select n from 3, 4 and 5, because the optical fibers 2 are automatically laid on the pattern shown in FIG. 5A, 5B or 5C in the through-hole 11a. In other words, the assembling worker is expected to simply insert the three, four or five optical fibers 2 into each through-hole 11a. The space in the central zone is too narrow to accept an optical fiber 2. For this reason, the three, four or five optical fibers 2 occupy the peripheral zone of each through-hole 11a in such a manner as to satisfy Equation 3.

If n is 6, the six optical fibers 2X are held in contact with the inner surface defining the through-hole 11a and with one another, and, accordingly, satisfy Equation 3. However, there remains a space in the central zone as wide as an optical fiber. If any dummy fiber does not occupy the space, one of the six optical fibers 2X is fallen into the space, and the optical fibers 2X loose the pattern. In order to keep the six optical fibers 2X in the pattern, it is necessary to insert a dummy fiber 2Y into the space. If n is greater than 6, at least one dummy fiber 2Y is required for the optical fibers 2X. When the optical fibers 2X are inserted into the through-hole 11a together with the dummy fiber 2Y, the assembling worker is expected to keep the optical fibers 2X around the dummy fiber 2Y. If the dummy fiber 2Y is undesirably replaced with one of the optical fibers 2X, the optical system 1s can not detect a present key/hammer position due to the dummy fiber 2Y. Thus, the assembling worker is expected to be more careful in the assembling work, and slows down the assemblage.

As described hereinbefore, the optical fiber plug 11 and light-emitting diode socket 12 as a whole constitute a multicore optical fiber connector. The light-emitting diode socket 12 serves as a device holder, and each of the through-holes 11a and each of the through-holes 12a are corresponding to at least one first hole and at least one second hole, respectively. The light intensity is an example of the optical characteristics.

As will be understood from the foregoing description, the multicore optical fiber connector 11/12 according to the present invention is formed with a hollow space in which the plural optical fibers are disposed at respective positions in such a manner that the distances between the center axis CL1, which is coincident with the optical axis P1, and the center axes P2 of the optical fibers 2 are equal to one another. The light intensity is isotropically distributed with respect to the center axis CL1. For this reason, the total amount of incident light is constant among the optical fibers 2.

The distances between the optical axis P1 and the center axes P2 are automatically adjusted to a constant value in so far as the through-hole 11a satisfies Equation 3. Thus, the designer easily designs the optical fiber plug 11. Especially, if the optical fibers 2 are 3, 4 or 5, the optical fibers 2 are automatically arranged in such a manner as to satisfy Equation 3. When the assembling worker simply inserts the three, four or five optical fibers 2 into the optical fiber plug 11, the distances become constant, and the total amount of incident light is equalized among the optical fibers 2.

Moreover, each of the optical fibers 2 is stably held in contact with the inner surface defining the associated through-hole 11a and with the adjacent optical fibers 2. The contact area is wide enough to prevent the optical fibers 2 from drawing out.

The injection holes 11b are desirable for the optical fiber plug 11. The assembling worker easily injects the adhesive compound liquid into the through-holes 11a. The optical fibers 2 are adhered to the inner surfaces and to one another, and enhances the resistance against the drawing force.

Second Embodiment

FIGS. 6A–6D show fiber retainers C1, C2, C3 and C4 used for another optical sensor array 50. The optical sensor array 50 is only different from the optical sensor array 1p in that the optical fibers 2 are supported by the fiber retainer C1, C2, C3 and/or C4 in a peripheral zone of the through-holes 11a. For this reason, description is focused on the fiber retainers C1 to C4.

Figure 6:
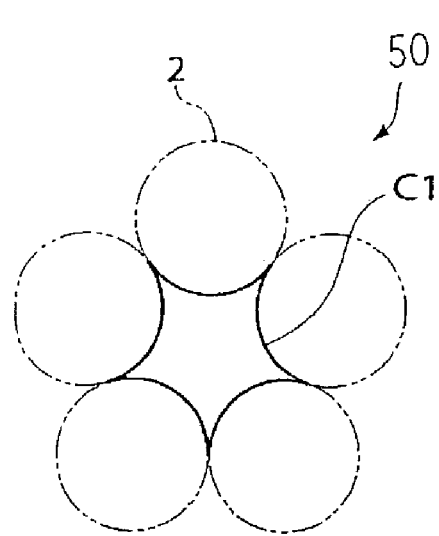
FIGS. 6A to 6D are schematic views showing fiber retainers for optical fibers incorporated in another optical sensor array.
Figure 6:
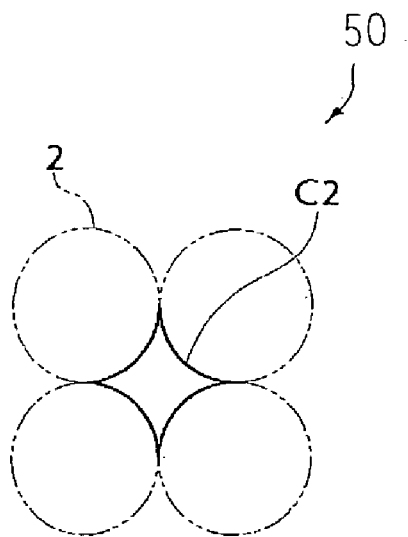
Figure 6:
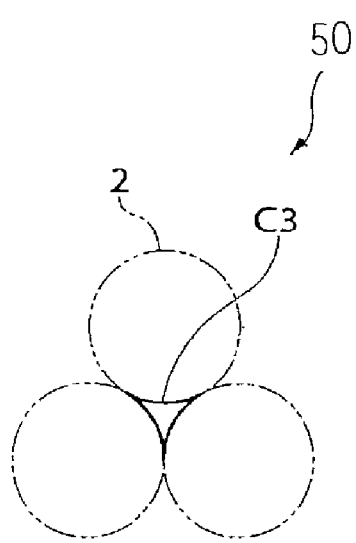
Figure 6:
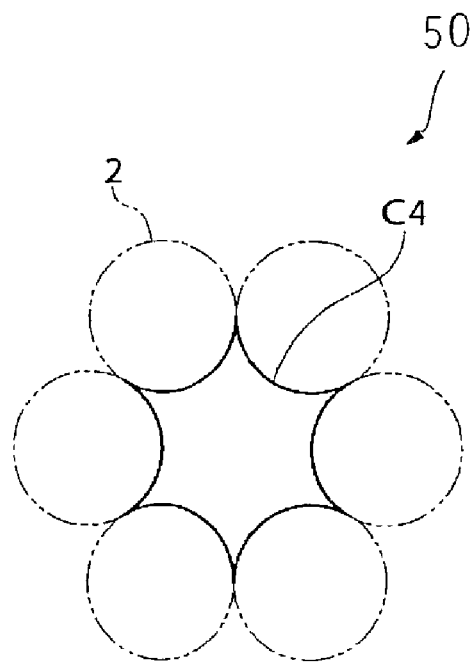

When five optical fibers 2 are inserted into one of the through-holes 11a, the fiber retainer C1 is prepared, and the five optical fibers 2 are retained on the periphery of the fiber retainer C1 as shown in FIG. 6A. In case where four optical fibers 2 are inserted into one of the through-holes 11a, the fiber retainer C2 is prepared, and the four optical fibers 2 are retained on the periphery of the fiber retainer C2 as shown in FIG. 6B. If the bundle FB consists of three optical fibers 2, the retainer C3 is required. Even if the optical fibers 2 are increased to 6, the retainer C4 stably keeps the six optical fibers 2 in the through-hole 11a. Thus, the retainers C1, C2, C3 and C4 keep the optical fibers 2 equally spaced from the optical axis, and stably permit the manufacturer to increase the optical fibers greater than 5.

The optical fibers 2 are adhered to the retainer C1, C2, C3 or C4 and to each other. The optical fibers 2 are either held in contact with or spaced from the inner surface defining the through-hole. In case where the optical fibers 2 are held in contact with the inner surface, the optical fibers 2 are adhered to the inner surface, and the relation between the optical fibers 2 and the through-hole 11a is also expressed by Equation 3. The optical sensor array 50 achieves all the advantages of the first embodiment.

Although particular embodiments of the present invention have been shown and described, it will be apparent to those skilled in the art that various changes and modifications may be made without departing from the spirit and scope of the present invention.

The multicore optical fiber connector according to the present invention may be used in another sort of keyboard musical instrument such as, for example, automatic player piano, keyboard musical instrument for practical use and electronic pianos. The keyboard musical instrument does not set any limit to the scope of the present invention. The multicore optical fiber connector may be incorporated in another sort of musical instrument such as, for example, an optical pickup device incorporated in electronic stringed instruments and key sensors of electronic wind instruments. The multicore optical fiber connector according to the present invention may be used in other applications. For example, the multicore optical fiber connector may form a part of an optical sensor for inspecting products.

A multicore optical fiber connector according to the present invention may be formed with through-holes different in diameter. In this instance, the through-holes satisfy Equation 3 at different "n". This means that the bundles are different in number of optical fibers from one another.

Optical fibers may have non-circular cross section in so far as the optical fibers to be inserted in each through-hole are equal in cross sectional area to one another. Even if optical fibers have a sectorial cross section or polygonal cross section, the optical fibers are available for the optical sensor array.

The optical fibers may be spaced from the inner surfaces defining the through-holes. In this instance, each of the optical fibers is adhered to the adjacent optical fibers, and the bundle of optical fibers is supported by a retainer in the through-hole. For example, the optical fibers are adhered to one another in a jig, and the bundle of optical fibers is inserted into the through-hole together with a retainer. The retainer keeps the optical fibers equally spaced from the optical axis. The retainer may be a ring, and the ring is held in contact with the inner surface defining the through-hole. After insertion into the ring, the optical fibers may be adhered to one another. Otherwise, an inwardly projected retainer has been built in the through-hole. In this instance, the through-hole or holes may be rectangular, triangle or elliptical in cross section.

In the second embodiment, the fiber retainers C1–C4 may keep the optical fibers 2 spaced from the adjacent optical fibers.

The light emitting device does not set any limit to the technical scope of the present invention. The multicore optical fiber connector according to the present invention may optically couple another sort of optical element to plural optical fiber for equalizing optical characteristics at end surfaces of the optical fibers.

The entire disclosure as set forth in Priority Document 2002-123745 is set forth herein by reference.

What is claimed is:

1. An optical sensor array comprising:
   photo-emitting sensor heads for radiating light beams, respectively;
   first optical fibers having photo-propagation paths equal in cross sectional area to one another, and connected to said photo-emitting sensor heads, respectively, for propagating said light beams to said photo-emitting sensor heads;
   photo-receiving sensor heads provided on optical paths of said light beams for receiving said light beams, respectively;
   second optical fibers respectively connected to said photo-receiving sensor heads for propagating said light beams from said photo-receiving sensor heads to the other ends thereof;
   a light detecting unit connected to said other ends thereof for converting said light beams to output electric signals; and
   a light emitting unit including
   a light emitting device converting an input electric signal to said light beams,
   a device holder formed with at least one first hole having a first center axis coincident with a first optical axis of said light emitting device, which exhibit a light intensity isotropically distributed in said at least one first hole with respect to said first optical axis, and
   an optical fiber plug coupled to said device holder, formed with at least one second hole having a second center axis aligned with said first optical axis, and keeping said first optical fibers in said at least one second hole in such a manner that distances between said first optical axis and second optical axes of said first optical fibers are equal to one another, thereby making said light beams equivalent in total amount of light to one another.

2. The optical sensor array as set forth in claim 1, in which said at least said first optical fibers are held in contact with one another in a peripheral zone of said at least one second hole.

3. The optical sensor array as set forth in claim 2, in which said first optical fibers are further held in contact with an inner surface of said optical fiber plug defining said at least one second hole.

4. The optical sensor array as set forth in claim 3, in which said at least one second hole and said first optical fibers have a first circular cross section and second circular cross sections, respectively, and said first circular cross section and said second circular cross sections satisfy the following equation $$R = r + r/\sin(\pi/n)$$

where R is the radius of curvature of said first circular cross section, r is the radius of curvature of said second circular cross sections and n is the number of said first optical fibers.

5. The optical sensor array as set forth in claim 4, in which said n is selected from the group consisting of 3, 4 and 5.

* * * * *